Aug. 24, 1948.  C. E. KLUMB  2,447,582
CASTER CONSTRUCTION
Filed Aug. 10, 1945
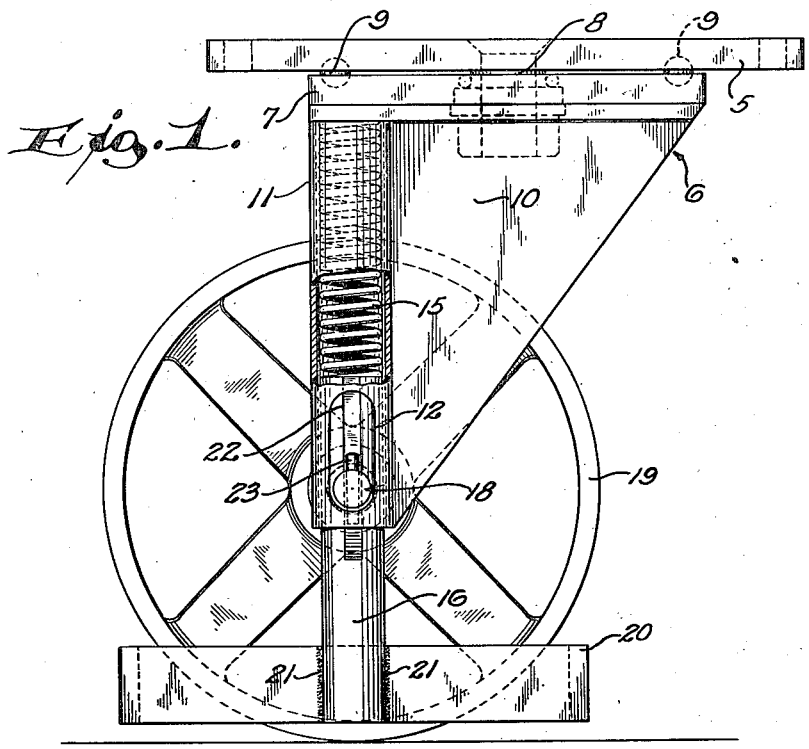
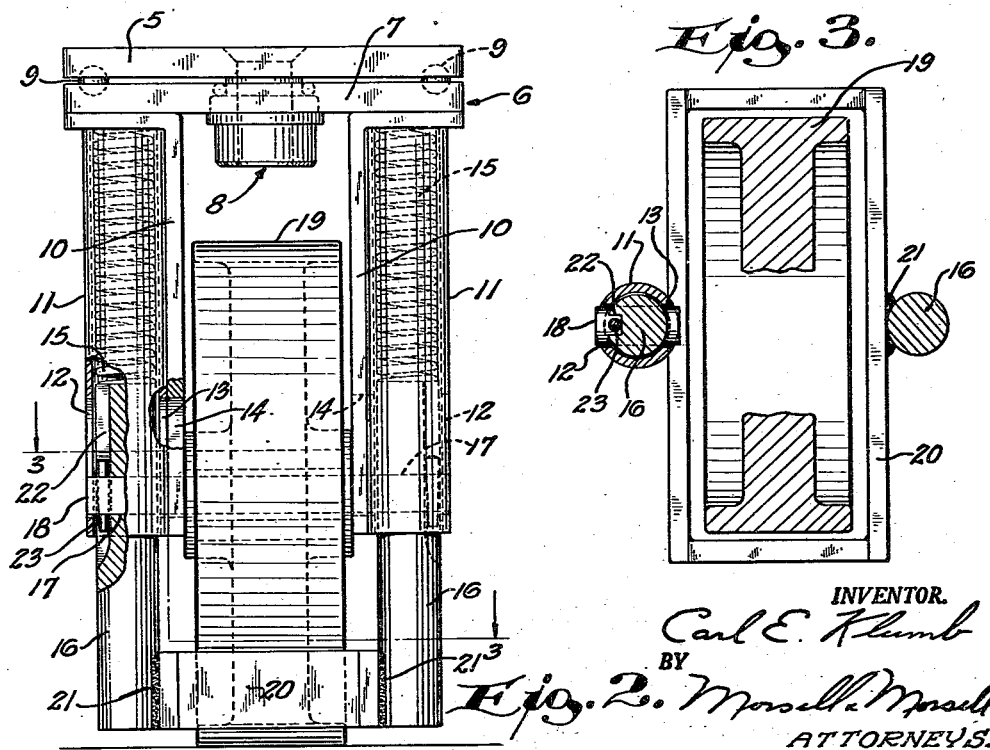
INVENTOR.
Carl E. Klumb
BY
Morsell & Morsell
ATTORNEYS.

Patented Aug. 24, 1948

2,447,582

UNITED STATES PATENT OFFICE 2,447,582

CASTER CONSTRUCTION

Carl E. Klumb, West Bend, Wis., assignor to West Bend Equipment Corporation, West Bend, Wis., a corporation of Wisconsin Application August 10, 1945, Serial No. 609,986

5 Claims. (Cl. 16—44)

This invention relates to improvements in caster constructions.

In the use of platform trucks there are usually one or more caster wheels for supporting one or both ends of the truck. Inasmuch as these trucks are used in factories, warehouses, and other places for hauling heavy materials, it is a relatively common occurrence for a workman to seriously injure his foot by letting one of the casters of a loaded truck roll over it.

It is, therefore, a general object of the present invention to provide an improved caster construction which includes a novel form of guard so associated with the caster near the floor line as to prevent the wheel from rolling over a workman's foot.

A further object of the invention is to provide a novel form of foot guard which may be used in conjunction with a spring bearing type of caster. Spring bearing casters are in common use because they make it easier to push the truck and furthermore the springs take up shocks when the truck is being pushed over a bump and prevent transmission of the jar to the truck and material thereon. However, to provide a guard for a spring bearing type of caster presented problems because, to be effective, the guard must not drag on the floor to interfere with movement of the truck and must always maintain the same distance from the floor regardless of the state of compression of the bearing springs.

It is, therefore, a further object of the invention to provide an improved caster construction including a spring bearing, wherein the guard is so arranged as to always move vertically with the caster wheel as the spring is acting to absorb shocks.

A further object of the invention is to provide an improved caster construction, including a novel form of foot guard, wherein the guard is so mounted that it will not swing or roll on the axle.

A further object of the invention is to provide a device as above described which is adapted for use on various types of vehicles, which is simple and inexpensive in construction, which is strong and durable, and which is well adapted for the purpose described.

With the above and other objects in view, the invention consists of the improved caster construction, and all its parts and combinations, as set forth in the claims, and all equivalents thereof.

In the accompanying drawing, illustrating one complete embodiment of the preferred form of the invention, in which the same reference numerals designate the same parts in all of the views, Fig. 1 is a side elevational view of the caster construction, part being broken away and shown in section, Fig. 2 is a front view thereof, parts being broken away and shown in section, and Fig. 3 is a sectional view taken on line 3—3 of Fig. 2.

Referring more particularly to the drawing, the numeral 5 designates a plate which is adapted to be bolted or otherwise secured to the bottom of the truck. Swivelled to the lower side of the plate 5 is a yoke or wheel support 6. The yoke includes a top swivel plate 7 and the swivel connection may be of any desired type as indicated by the numeral 8. A ballbearing race 9 may also be included between the plates 5 and 7.

Depending from the plate 7, in spaced relationship from each other, are brackets 10, and secured to the brackets 10 are vertical spring housing sleeves 11. Each sleeve, near its lower end, has oppositely disposed axle slots 12 and 13, and the bracket members 10 have slots 14 which register with the slots 13.

Slidable axially in the sleeves 11, against the tension of springs 15, are vertical posts 16. Each post is provided intermediate its length with a transverse axle hole 17. Extending through said holes and through the slots 12, 13 and 14 is an axle 18. Rotatably supported on the axle in the space between the brackets 10 is a wheel or roller 19. The lower portion of the wheel is rotatable within a foot guard frame 20 and the latter is preferably rectangular as illustrated, and is welded or otherwise rigidly secured as at 21 to the lower ends of the slidable posts 16. Each of the posts 16 may have a side vertical groove 22 to accommodate an axle pin 23.

From the above it is apparent that the upper ends of the foot guard posts form bearing blocks which are movable in the sleeves 11 against the tension of the springs 15. It is also apparent that if, in going over a bump, the wheel 19 is urged upwardly, that the foot guard 19 as well as the foot guard post 16, will always yield with the wheel. This movement, of course, is permitted by movement of the ends of the axle in the slots 12, 13 and 14. Thus, the use of a foot guard with a spring bearing type of caster is rendered entirely practical because the guard frame 20 will never drag on the floor and will always maintain a position sufficiently close to the floor to afford the desired protection.

The guard arrangement of the present invention is also suitable for use with casters which do not include the spring featutre and, therefore, features of the present invention are not necessarily limited to the spring bearing application.

Various other changes and modifications may be made without departing from the spirit of the invention and all of such changes are contemplated as may come within the scope of the claims.

What I claim is:

1. In a caster construction, a depending bracket, a wheel, means in said bracket rotatably supporting said wheel for vertical yielding movement, a foot guard near the lower peripheral portion of the wheel, and means connected to the wheel support for supporting said foot guard for vertical yielding movement with the wheel.

2. In a caster construction, a depending bracket having at least one vertical sleeve connected thereto, a spring in said sleeve, a post slidable in the lower end of said sleeve against the tension of said spring, a foot guard connected to the lower portion of said post, and a wheel rotatably connected to said post and having its lowermost periphery depending below the foot guard.

3. In a caster construction, a depending yoke having spaced brackets, a vertical sleeve connected to each bracket, a spring in each sleeve, a post slidable in the lower end of each sleeve against the tension of said spring, a foot guard connected to the lower ends of said posts, and a wheel between the spaced brackets of the yoke rotatably connected to said posts and having its lowermost periphery project below the guard and protected thereby.

4. In a caster construction, a depending bracket having at least one vertical sleeve connected thereto, said sleeve having at least one vertical side slot, a spring in said sleeve, a post slidable in the lower end of the sleeve against the tension of said spring, a foot guard connected to the lower end of said post, an axle having an end connected to said post and movable vertically in the slot of the sleeve, and a wheel rotatably supported by said axle and having its lowermost periphery projecting below the guard.

5. In a caster construction a depending yoke having spaced brackets, a vertical sleeve connected to each bracket and having a vertical side slot, said brackets also having openings which are in registration with said slots, a spring in each sleeve, a post slidable in the lower end of each sleeve against the tension of said spring, a foot guard connected to the lower ends of said posts, an axle having its ends connected to said posts and movable vertically in the slots of said sleeves and in the openings of said brackets, and a wheel between the brackets rotatable on said axle and having its lowermost periphery projecting below the foot guard.

CARL E. KLUMB.

REFERENCES CITED

The following references are of record in the file of this patent:

UNITED STATES PATENTS

| Number | Name | Date |
| --- | --- | --- |
| 888,426 | Legge | May 19, 1908 |
| 951,553 | Williams et al. | Mar. 8, 1910 |
| 968,790 | Olsen | Aug. 30, 1910 |
| 1,012,404 | Means | Dec. 19, 1911 |
| 1,527,239 | Vaughan et al. | Feb. 24, 1925 |
| 1,749,751 | Bergsten | Mar. 11, 1930 |